United States Patent
Jiang et al.

(10) Patent No.: US 9,971,075 B2
(45) Date of Patent: May 15, 2018

(54) COLOR FILTER SUBSTRATE, METHOD FOR FABRICATING THE SAME, DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Liangliang Jiang, Beijing (CN); Yongjun Yoon, Beijing (CN); Lei Guo, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 78 days.

(21) Appl. No.: 15/159,396

(22) Filed: May 19, 2016

(65) Prior Publication Data
US 2017/0003423 A1    Jan. 5, 2017

(30) Foreign Application Priority Data
Jul. 1, 2015    (CN) .......................... 2015 1 0388572

(51) Int. Cl.
*G02B 5/22*    (2006.01)
*G02B 5/20*    (2006.01)
*G02F 1/1335*    (2006.01)

(52) U.S. Cl.
CPC ....... *G02B 5/201* (2013.01); *G02F 1/133514* (2013.01); *G02F 1/133617* (2013.01);
(Continued)

(58) Field of Classification Search
CPC ........ G02B 5/201; G02B 5/223; G02B 5/206; G02F 1/133514; G02F 1/133516;
(Continued)

(56) References Cited

U.S. PATENT DOCUMENTS

| 2011/0303940 A1* | 12/2011 | Lee ........................ H01L 33/54 257/98 |
| 2013/0335799 A1* | 12/2013 | Yoon ..................... G02B 26/02 359/227 |
| 2014/0017485 A1* | 1/2014 | Wenger ................. B82Y 30/00 428/320.2 |

FOREIGN PATENT DOCUMENTS

| CN | 1786753 A | 6/2006 |
| CN | 103235442 A | 8/2013 |
| JP | 2007041555 A | 2/2007 |

OTHER PUBLICATIONS

First Office Action dated Jun. 1, 2017 corresponding to Chinese application No. 201510388572.6.

* cited by examiner

*Primary Examiner* — Jade R Chwasz
(74) *Attorney, Agent, or Firm* — Nath, Goldberg & Meyer; Joshua B. Goldberg

(57) ABSTRACT

The present invention provides a color filter substrate, comprising a plurality of pixel units, each pixel unit comprises a plurality of sub-pixel regions, wherein a filling cavity is formed in each sub-pixel region, at least the top wall of the filling cavity is transparent, each filling cavity is filled with quantum dots, the quantum dots in all the filling cavities are made of the same material, the particle diameters of the quantum dots in the same filling cavity are the same, the particle diameters of the quantum dots in the filling cavities of different sub-pixel regions of any pixel unit are different, and accordingly, the quantum dots in the filling
(Continued)

cavities of different sub-pixel regions in any pixel unit can emit light of different colors after being excited. Accordingly, the present invention further provides a fabricating method of the color filter substrate, a display panel and a display device.

18 Claims, 3 Drawing Sheets

(52) U.S. Cl.
CPC ............... *G02F 1/133516* (2013.01); *G02F 2001/133519* (2013.01); *G02F 2202/36* (2013.01)

(58) Field of Classification Search
CPC ........... G02F 2201/52; G02F 1/133617; G02F 2202/36; G02F 2001/133519
USPC ........................................ 359/891, 885, 892
See application file for complete search history.

COLOR FILTER SUBSTRATE, METHOD FOR FABRICATING THE SAME, DISPLAY PANEL AND DISPLAY DEVICE

FIELD OF THE INVENTION

The present invention relates to the field of display technology, and particularly relates to a color filter substrate, a method for fabricating the same, a display panel including the color filter substrate and a display device including the display panel.

BACKGROUND OF THE INVENTION

At present, a common liquid crystal display adopts a white light emitting member as a light source, color resistance blocks with different colors are respectively arranged in a plurality of sub-pixel regions of each pixel unit of a color filter substrate, as shown in FIG. 1, red, green and blue color resistance blocks 1 may be respectively arranged, light of corresponding colors is emitted by the filtering effect of the color resistance blocks 1, and color display is realized by the light-mixing effect. However, due to the fact that the luminous efficiency in such a manner is limited, the light transmittance and the brightness are also limited, so the colors are generally impure and the color gamut of pictures is relatively low.

Quantum dots are a novel semiconductor nano material, have many unique nano properties, and are narrow and symmetrical in emission spectra, adjustable in color, high in photochemical stability and long in fluorescence lifetime, so the quantum dots have wide application on the aspect of wide color gamut display.

In the prior art, it has been proposed that doping a certain quantity of quantum dots in a color resistance block to improve the color gamut. However, non-uniform distribution of quantum dots may occur in this manner to influence the color gamut, and the exposure and the development of a color resistance block material may be influenced after the quantum dots are doped.

SUMMARY OF THE INVENTION

The objects of the present invention are to provide a color filter substrate, a method for fabricating the same, a display panel including the color filter substrate and a display device including the display panel, wherein the color gamut and the saturation of the display device can be improved by using the color filter substrate.

To fulfill the above objects, the present invention provides a color filter substrate, including a plurality of pixel units, wherein each pixel unit includes a plurality of sub-pixel regions, a filling cavity is formed in each sub-pixel region, at least the top wall of each filling cavity is transparent, the filling cavity is filled with quantum dots, the quantum dots in all the filling cavities are made of the same material, the particle diameters of the quantum dots in the same filling cavity are the same, the particle diameters of the quantum dots in the filling cavities of different sub-pixel regions of any pixel unit are different, and accordingly, the quantum dots in the filling cavities of different sub-pixel regions can emit light with different colors after being excited.

Preferably, the color filter substrate includes a substrate as well as a black matrix and a transparent packaging adhesive layer arranged on the substrate, the black matrix is arranged at the boundary of each sub-pixel region, and the filling cavities are defined by the black matrix, the transparent packaging adhesive layer and the substrate.

Preferably, the material of the quantum dots is any one of cadmium selenide, cadmium sulfide, cadmium telluride and zinc selenide.

Preferably, each pixel unit includes a red sub-pixel region, a blue sub-pixel region and a green sub-pixel region, the material of the quantum dots is cadmium selenide, the particle diameters of the quantum dots in the filling cavity of the blue sub-pixel region are more than or equal to 1.5 nm and less than 2.5 nm, the particle diameters of the quantum dots in the filling cavity of the green sub-pixel region are more than or equal to 2.5 nm and less than 3.5 nm, and the particle diameters of the quantum dots in the filling cavity of the red sub-pixel region are more than or equal to 3.5 nm and less than or equal to 4.5 nm.

Preferably, a mesoporous material is arranged in the filling cavities of at least the blue sub-pixel region and the green sub-pixel region, the mesoporous material is provided with a plurality of channels, the quantum dots in the filling cavities of the blue sub-pixel region and the green sub-pixel region are filled in the channels of the corresponding mesoporous material, the inner diameters of the channels of the mesoporous material in the same filling cavity are the same, the inner diameters of the channels of the mesoporous material in the filling cavity of the green sub-pixel region are smaller than the particle diameters of the quantum dots in the filling cavity of the red sub-pixel region, and the inner diameters of the channels of the mesoporous material in the filling cavity of the blue sub-pixel region are smaller than the particle diameters of the quantum dots in the filling cavity of the green sub-pixel region.

Preferably, the mesoporous material is arranged in the filling cavities of the red sub-pixel region, the blue sub-pixel region and the green sub-pixel region, and the quantum dots in the filling cavity of the red sub-pixel region are filled in the channels of the corresponding mesoporous material of the red sub-pixel region.

Accordingly, the present invention further provides a method for fabricating a color filter substrate, wherein the color filter substrate includes a plurality of pixel units, each pixel unit includes a plurality of sub-pixel regions, and the fabricating method includes:

S1, forming a filling cavity with an opening in each sub-pixel region;

S2, filling the filling cavity of each sub-pixel region with quantum dots, wherein the quantum dots in all the filling cavities are made of the same material, the particle diameters of the quantum dots in the same filling cavity are the same, and the particle diameters of the quantum dots in the filling cavities of different sub-pixel regions of any pixel unit are different; and S3, forming the top wall of each filling cavity, wherein at least the top wall of each filling cavity is transparent.

Preferably, step S1 includes: forming a black matrix at the boundary of each sub-pixel region on a substrate;

step S3 includes: forming a transparent packaging adhesive layer.

Preferably, the material of the quantum dots is any one of cadmium selenide, cadmium sulfide, cadmium telluride and zinc selenide.

Preferably, each pixel unit includes a red sub-pixel region, a blue sub-pixel region and a green sub-pixel region, and step S2 sequentially includes the following steps:

S21, separately forming a mesoporous material in the filling cavities of the blue sub-pixel region and the green sub-pixel region, wherein the mesoporous material is provided with a plurality of channels, the inner diameters of the channels of the mesoporous material in the same filling cavity are the same, and the inner diameters of the channels of the mesoporous material in the filling cavity of the green sub-pixel region are greater than those of the channels of the mesoporous material in the filling cavity of the blue sub-pixel region;

S22, filling the filling cavity of the red sub-pixel region with a plurality of quantum dots with a first particle diameter;

S23, filling the channels of the mesoporous material in the filling cavity of the green sub-pixel region with a plurality of quantum dots with a second particle diameter, wherein the inner diameters of the channels of the mesoporous material in the filling cavity of the green sub-pixel region are greater than or equal to the second particle diameter and smaller than the first particle diameter; and S24, filling the channels of the mesoporous material in the filling cavity of the blue sub-pixel region with a plurality of quantum dots with a third particle diameter, wherein the inner diameters of the channels of the mesoporous material in the filling cavity of the blue sub-pixel region are greater than or equal to the third particle diameter and smaller than the second particle diameter.

Preferably, steps S21, S23 and S24 further include a step of recovering the quantum dots which are not filled into the channels of the mesoporous material.

Preferably, step S21 further includes: arranging the mesoporous material in the filling cavity of the red sub-pixel region, wherein the inner diameters of the channels of the mesoporous material in the filling cavity of the red sub-pixel region are greater than or equal to the first particle diameter;

step S22 further includes: filling the plurality of quantum dots with the first particle diameter into the channels of the mesoporous material in the filling cavity of the red sub-pixel region.

Preferably, step S21 includes:

S21a, adding a template agent material into the filling cavity of each sub-pixel region to form a plurality of nuclear portions in each filling cavity, and the diameters of the plurality of nuclear portions in the same filling cavity are the same, the diameters of the nuclear portions in the filling cavity of the red sub-pixel region are greater than or equal to the first particle diameter, the diameters of the nuclear portions in the filling cavity of the green sub-pixel region are greater than or equal to the second particle diameter and smaller than the first particle diameter, and the diameters of the nuclear portions in the filling cavity of the blue sub-pixel region are greater than or equal to the third particle diameter and smaller than the second particle diameter;

S21b, forming a transparent shell on the surface of the nuclear portion; and

S21c, removing the nuclear portions and retaining the transparent shells, a plurality of transparent shells in each filling cavity form the mesoporous material.

Preferably, step S21b includes: adding a silicon-containing material, which can react with the template agent material to generate silicon dioxide, thus forming the transparent shells.

Preferably, the template agent material includes vinyl pyrrolidone and cetyltrimethylammonium bromide, and the silicon-containing material includes tetraethyl orthosilicate.

Preferably, step S22 includes:

S22a, adding a plurality of quantum dots with a first particle diameter into a solvent capable of dispersing the plurality of quantum dots with the first particle diameter to form a first suspension; and S22b, filling the first suspension into the channels of the mesoporous material in the filling cavity of the red sub-pixel region.

Step S23 includes:

S23a, adding a plurality of quantum dots with a second particle diameter into a solvent capable of dispersing the plurality of quantum dots with the second particle diameter to form a second suspension; and S23b, filling the second suspension into the channels of the mesoporous material in the filling cavity of the green sub-pixel region.

Step S24 includes:

S24a, adding a plurality of quantum dots with a third particle diameter into a solvent capable of dispersing the plurality of quantum dots with the third particle diameter to form a third suspension; and S24b, filling the third suspension into the channels of the mesoporous material in the filling cavity of the blue sub-pixel region.

Preferably, the fabricating method further includes:

separately evaporating the solvents in the first suspension, the second suspension and the third suspension in the filling cavities.

Preferably, the material of the quantum dots is cadmium selenide, the first particle diameter is more than or equal to 1.5 nm and less than 2.5 nm, the second particle diameter is more than or equal to 2.5 nm and less than 3.5 nm, and the third particle diameter is more than or equal to 3.5 nm and less than or equal to 4.5 nm.

Furthermore, the present invention further provides a display panel, including the above color filter substrate according to the present invention.

In addition, the present invention further provides a display device, including the above display panel Furthermore the present invention and a back light, wherein the back light is used for emitting light with a single wavelength.

Preferably, the light emitted by the back light is blue light or purple light.

The quantum dots with the characteristics of wide excitation spectra and narrow and symmetrical emission spectra can efficiently convert the light of the back light into desired light and have high Stokes shift, so the display device provided with the quantum dots in the sub-pixel regions of the color filter substrate can have wider color gamut and higher saturation. According to the present invention, each sub-pixel region is provided with a filling cavity filled with quantum dots, so color resistance blocks are not needed for the color filter substrate, and then the fabricating process is simplified; and because the quantum dots are distributed more uniformly, the color gamut can be significantly improved.

BRIEF DESCRIPTION OF THE DRAWINGS

The accompanying drawings are used for providing further understanding of the present invention, constituting a part of the description, and interpreting the present invention together with the embodiments below, rather than limiting the present invention.

In which: 1, color resistance block; 2, black matrix; 3, quantum dot; 4, packaging adhesive layer; 5, mesoporous material; 6, substrate; 7, nuclear portion; 8, transparent shell.

DESCRIPTION OF THE PREFERRED EMBODIMENT

The embodiments of the present invention will be described in detail below in combination with the accompanying drawings. It should be understood that, the embodiments described herein are merely used for describing and interpreting the present invention, rather than limiting the present invention.

Figure 1:
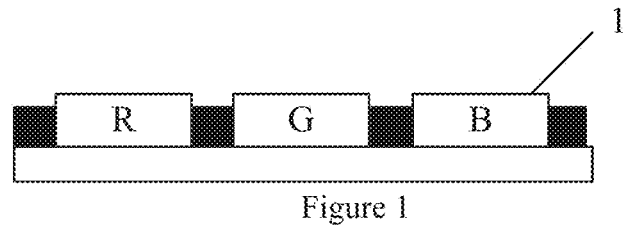
FIG. 1 is a structural schematic diagram of an existing color filter substrate.
Figure 2:
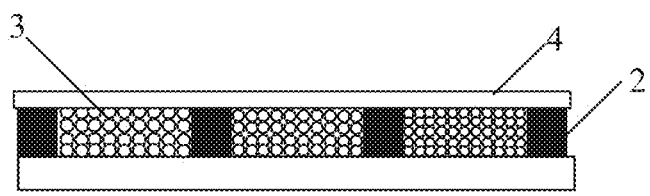
FIG. 2 is a structural schematic diagram of a color filter substrate according to an embodiment of the present invention.

As a first aspect of the present invention, provided is a color filter substrate, including a plurality of pixel units, wherein each pixel unit includes a plurality of sub-pixel regions, a filling cavity is formed in each sub-pixel region, at least the top wall of each filling cavity is transparent, the filling cavity is filled with quantum dots 3 (as shown in FIG. 2), the quantum dots filled in all the filling cavities are made of the same material, the particle diameters of the quantum dots in the same filling cavity are the same, the particle diameters of the quantum dots 3 in the filling cavities of different sub-pixel regions of any pixel unit are different, and accordingly, the quantum dots in the filling cavities of different sub-pixel regions in any pixel unit can emit light with different colors after being excited.

The quantum dots with the characteristics of wide excitation spectra and narrow and symmetrical emission spectra can efficiently convert the light of a back light into desired light, and the quantum dots have high Stokes shift, that is, the energy absorbed from the back light is higher than the energy of radiation, so superposition of emission spectra and excitation spectra can be avoided and the purity of emitted light can be improved. The quantum dots have size effect, and the emission spectra thereof can be controlled through the size of the quantum dots. Thus, a display device provided with the quantum dots in the sub-pixel regions of the color filter substrate can have wider color gamut and higher saturation. In addition, doping a certain quantity of quantum dots in color resistance blocks in the prior art may result in non-uniform distribution of the quantum dots and influence the exposure and development process when the color resistance blocks are formed, while in the present invention, each sub-pixel region is provided with a filling cavity filled with quantum dots, so color resistance blocks are not needed for the color filter substrate, and then the fabricating process is simplified; and because the quantum dots are distributed more uniformly, the color gamut can be significantly improved.

Light for exciting quantum dots is the one with a single wavelength. In a preferred embodiment, the light emitted by a back light may be the one with a short wavelength and high energy, e.g. blue light or purple light.

The term "top wall" used in the present invention indicates a wall of the filling cavity away from the substrate side, and the light emitted after the quantum dots are excited can pass through the wall. The top walls of each filling cavity can be connected with each other, for example, can be formed by a transparent packaging adhesive layer 4.

In the present invention, the filling cavities can be in different forms, for example, groove structures are etched in the substrate, and after the grooves are filled with quantum dots 3, then the transparent top walls is formed. In a embodiment, as shown in FIG. 2, the color filter substrate includes a substrate 6 as well as a black matrix 2 and a transparent packaging adhesive layer 4 arranged on the substrate 6, the black matrix 2 is arranged at the boundary of each sub-pixel region, and the filling cavities are defined by the black matrix 2, the transparent packaging adhesive layer 4 and the substrate 6. In a display device, the color filter substrate is opposite to an array substrate, data lines, gate lines and thin film transistors are arranged on the array substrate, and the black matrixes 2 can shield the data lines, the gate lines and the thin film transistors, so other steps of etching and the like are not needed for separately fabricating the filling cavities in the mode of forming the filling cavities with the black matrix 2 and the transparent packaging adhesive layer 4, and then the fabricating process is simplified.

Specifically, the material of the quantum dots is any one of cadmium selenide, cadmium sulfide, cadmium telluride and zinc selenide.

In the present invention, the colors of a plurality of sub-pixel regions of each pixel unit are not limited, for example, each pixel unit may include red, green and blue sub-pixel regions, or include red, green, blue and yellow sub-pixel regions, or be in other setting modes.

As a embodiment of the present invention, each pixel unit includes a red sub-pixel region, a blue sub-pixel region and a green sub-pixel region, the quantum dots are made of cadmium selenide, the particle diameters of the quantum dots in the filling cavity of the blue sub-pixel region are more than or equal to 1.5 nm and less than 2.5 nm, the particle diameters of the quantum dots in the filling cavity of the green sub-pixel region are more than or equal to 2.5 nm and less than 3.5 nm, and the particle diameters of the quantum dots in the filling cavity of the red sub-pixel region are more than or equal to 3.5 nm and less than or equal to 4.5 nm. For example, the particle diameters of the quantum dots in the filling cavity of the blue sub-pixel region are 1.5 nm, the particle diameters of the quantum dots in the filling cavity of the green sub-pixel region are 2.5 nm, and the particle diameters of the quantum dots in the filling cavity of the red sub-pixel region are 3.5 nm. Or, the particle diameters of the quantum dots in the filling cavity of the blue sub-pixel region are 2.4 nm, the particle diameters of the quantum dots in the filling cavity of the green sub-pixel region are 3.4 nm, and the particle diameters of the quantum dots in the filling cavity of the red sub-pixel region are 4.4 nm. Preferably, the particle diameters of the quantum dots in the filling cavity of the blue sub-pixel region are 2 nm, the particle diameters of the quantum dots in the filling cavity of the green sub-pixel region are 3 nm, and the particle diameters of the quantum dots in the filling cavity of the red sub-pixel region are 4 nm.

It could be understood that, when each pixel unit includes sub-pixel regions of other colors, the particle diameters of the quantum dots can be correspondingly adjusted, so that the quantum dots of each sub-pixel region emit light of the corresponding color after being excited by the light of a back light. The energy of light emitted by the quantum dots is lower than that of light for exciting the quantum dots, so the light of the back light for exciting the quantum dots can be blue light or purple light with high energy.

When the color filter substrate is manufactured, a mesoporous material may be formed in each filling cavity in order to conveniently fill each filling cavity with quantum dots, the quantum dots are filled into the channels of the mesoporous material, and after the quantum dots are filled, the mesoporous material may be removed by a chemical method or retained.

The term "mesoporous material" used in the present invention indicates a porous material having the aperture of 2 nm to 50 nm and having the characteristics of extremely high specific surface area, narrow aperture distribution, adjustable aperture size and the like.

Specifically, a mesoporous material is arranged in the filling cavities of at least the blue sub-pixel region and the green sub-pixel region, the mesoporous material is provided with a plurality of channels, the quantum dots in the filling cavities of the blue sub-pixel region and the green sub-pixel region are filled in the channels of the corresponding mesoporous material, the inner diameters of the channels of the mesoporous material in the same filling cavity are the same, the inner diameters of the channels of the mesoporous material in the filling cavity of the green sub-pixel region are smaller than the particle diameters of the quantum dots in the filling cavity of the red sub-pixel region, and the inner diameters of the channels of the mesoporous material in the filling cavity of the blue sub-pixel region are smaller than the particle diameters of the quantum dots in the filling cavity of the green sub-pixel region.

When the color filter substrate is manufactured, quantum dots with a first particle diameter are fully filled into the filling cavity of the red sub-pixel region, then quantum dots with a second particle diameter are fully filled into the channels of the mesoporous material in the filling cavity of the green sub-pixel region, and then quantum dots with a third particle diameter are filled into the channels of the mesoporous material in the filling cavity of the blue sub-pixel region. Wherein, the first particle diameter is greater than the second particle diameter, and the second particle diameter is greater than the third particle diameter. The inner diameters of the channels of the mesoporous material in the filling cavity of the green sub-pixel region are smaller than the first particle diameter, and the inner diameters of the channels of the mesoporous material in the filling cavity of the blue sub-pixel region are smaller than the second particle diameter, accordingly when quantum dots are filled into the filling cavity of the red sub-pixel region, the quantum dots with the first particle diameter do not fall into the blue sub-pixel region or the green sub-pixel region; when quantum dots are filled into the filling cavity of the green sub-pixel region, the quantum dots with the second particle diameter do not fall into the filling cavity of the blue sub-pixel region, so that the particle diameters of the quantum dots in the filling cavity of each sub-pixel region are the same.

Of course, the mesoporous material may also be arranged in all the filling cavities of the red sub-pixel region, the green sub-pixel region and the blue sub-pixel region, and the quantum dots in the filling cavity of the red sub-pixel region are filled in the channels of the mesoporous material of the red sub-pixel region. It could be understood that, the inner diameters of the channels of the corresponding mesoporous material of the red sub-pixel region should be greater than or equal to the particle diameter of the quantum dots in the filling cavity of the red sub-pixel region.

After the color filter substrate is manufactured, the mesoporous material may be retained or removed. It should be noted that, the material for fabricating the mesoporous material is transparent to prevent displayed pictures from shading light.

Figure 3:
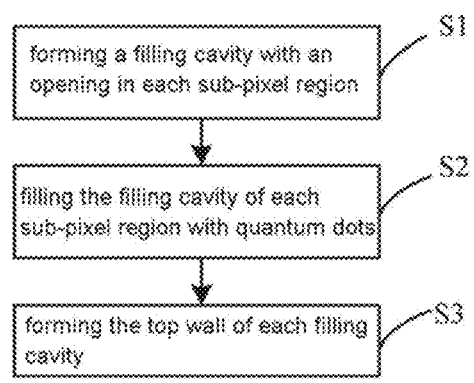
FIG. 3 is a schematic diagram of a method for fabricating a color filter substrate according to an embodiment of the present invention.

As a second aspect of the present invention, provided is a method for fabricating a color filter substrate, wherein the color filter substrate includes a plurality of pixel units, each pixel unit includes a plurality of sub-pixel regions, and as shown in FIG. 3, the fabricating method includes:

S1, forming a filling cavity with an opening in each sub-pixel region;

S2, filling the filling cavity of each sub-pixel region with quantum dots, wherein the quantum dots filled in all the filling cavities are made of the same material, the particle diameters of the quantum dots in the same filling cavity are the same, and the particle diameters of the quantum dots in the filling cavities of different sub-pixel regions of any pixel unit are different, so that the quantum dots in the filling cavities of different sub-pixel regions of any pixel unit can emit light of different colors after being excited; and S3, forming the top wall of each filling cavity, wherein at least the top wall of each filling cavity is transparent.

Figure 4:
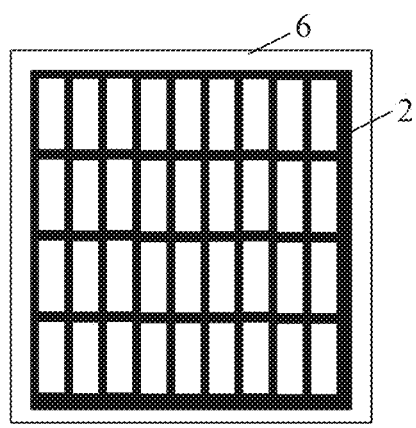
FIG. 4 is a top view after a black matrix is formed on a substrate according to an embodiment of the present invention.
Figure 5:
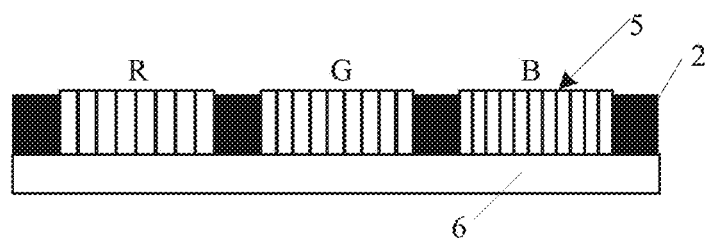
FIG. 5 to FIG. 8 are schematic diagrams of processes of filling each sub-pixel region with quantum dots.
Figure 6:
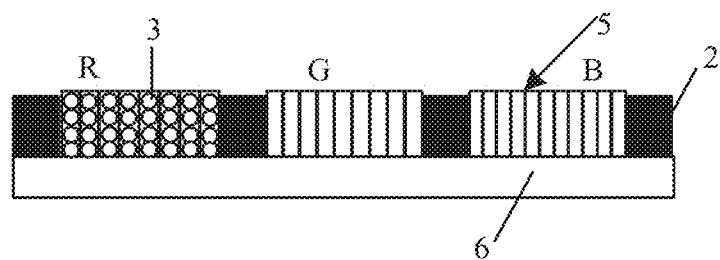

Specifically, step S1 includes: forming a black matrix 2 at the boundary of each sub-pixel region on a substrate 6, as shown in FIG. 4. Step S3 includes: forming a transparent packaging adhesive layer 4, so that after each filling cavity is filled with quantum dots in step S2, the transparent packaging adhesive layer 4 packages the quantum dots into the corresponding sub-pixel regions.

Specifically, the material of the quantum dots is any one of cadmium selenide, cadmium sulfide, cadmium telluride and zinc selenide.

Figure 7:
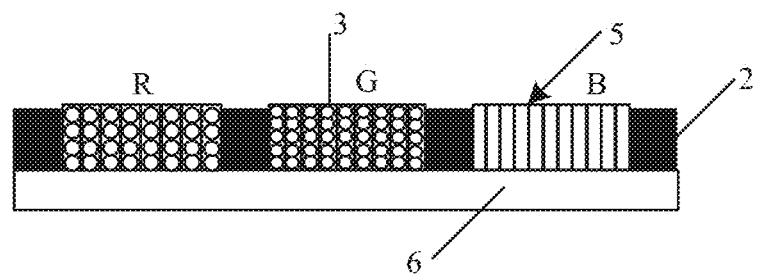
Figure 8:
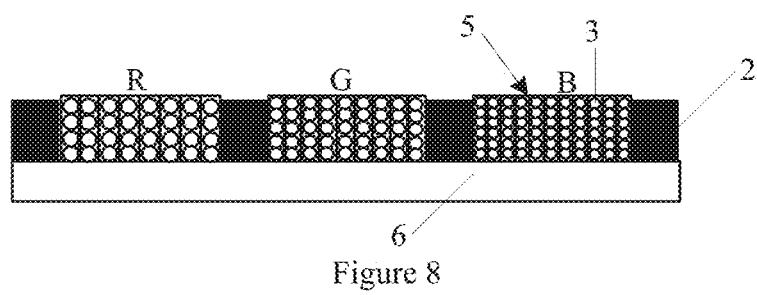

As a embodiment, each pixel unit includes a red sub-pixel region (R region shown in FIG. 5 to FIG. 8), a blue sub-pixel region (B region shown in FIG. 5 to FIG. 8) and a green sub-pixel region (G region shown in FIG. 5 to FIG. 8), and step S2 sequentially includes the following steps:

S21, separately forming a mesoporous material 5 in the filling cavities of the blue sub-pixel region and the green sub-pixel region, wherein the mesoporous material 5 is provided with a plurality of channels, the inner diameters of the channels of the mesoporous material in the same filling cavity are the same, and the inner diameters of the channels of the mesoporous material in the filling cavity of the green sub-pixel region are greater than those of the channels of the mesoporous material in the filling cavity of the blue sub-pixel region;

S22, filling the filling cavity of the red sub-pixel region with a plurality of quantum dots with a first particle diameter;

S23, filling the channels of the mesoporous material in the filling cavity of the green sub-pixel region with a plurality of quantum dots with a second particle diameter, wherein the inner diameters of the channels of the mesoporous material in the filling cavity of the green sub-pixel region are greater than or equal to the second particle diameter and smaller than the first particle diameter (as shown in FIG. 7); and S24, filling the channels of the mesoporous material in the filling cavity of the blue sub-pixel region with a plurality of quantum dots with a third particle diameter, wherein the inner diameters of the channels of the mesoporous material in the filling cavity of the blue sub-pixel region are greater than or equal to the third particle diameter and smaller than the second particle diameter (as shown in FIG. 8).

As for the quantum dots of the same material, the wavelength of light emitted after light excitation is gradually reduced along with reduction of the particle diameters, that is, the color of the emitted light shifts from red to blue. When each pixel unit includes a red sub-pixel region, a blue sub-pixel region and a green sub-pixel region, the particle diameters of the quantum dots in the red sub-pixel region are greatest, and the particle diameters of the quantum dots in the blue sub-pixel region are smallest. That is, the first particle diameter is greater than the second particle diameter, and the second particle diameter is greater than the third particle diameter. Thus, when the filling cavity of the red sub-pixel region is filled with the quantum dots with the first particle diameter, the inner diameters of the channels of the mesoporous materials of the blue sub-pixel region and the green sub-pixel region are smaller than the first particle diameter, so that the quantum dots with the first particle diameter are prevented from falling into the blue sub-pixel region or the green sub-pixel region. It could be understood that, the method may include a step between steps S22 and S23 as well as between steps S23 and S24: recovering the quantum dots which are not filled into the channels of the mesoporous material. Thus, when the quantum dots with the second particle diameter are filled in step S23, the quantum dots with the second particle diameter can be smoothly filled into the channels of the corresponding mesoporous material of the green sub-pixel region, moreover, the filling cavity of the red sub-pixel region is full of the quantum dots with the first particle diameter, and the inner diameters of the channels of the corresponding mesoporous material of the blue sub-pixel region are smaller than the second particle diameter, so the quantum dots with the second particle diameter may also not fall into the red sub-pixel region or the blue sub-pixel region. Similarly, the quantum dots with the third particle diameter may also be smoothly filled into the channels of the mesoporous material of the blue sub-pixel region, but do not fall into the red sub-pixel region or the green sub-pixel region.

The mesoporous material may also be arranged in the filling cavity of the red sub-pixel region, and step S21 may further include: arranging the mesoporous material in the filling cavity of the red sub-pixel region, wherein the inner diameters of the channels of the mesoporous material in the filling cavity of the red sub-pixel region are greater than or equal to the first particle diameter; and step S22 includes: filling the plurality of quantum dots with the first particle diameter into the channels of the mesoporous material in the filling cavity of the red sub-pixel region.

The above mesoporous material may be manufactured by a conventional fabricating method of mesoporous materials, for example, a template method, a sol-gel method, a layer-by-layer self-assembly method and the like. The mesoporous material may be manufactured by the template method in the present invention, that is, polymer particles (e.g. ion exchange resin and polymer latex particles) are used as a template and added with inorganic ions (e.g. metal particles and metal oxide), core-shell structures are formed by surface reaction or surface deposition, then the template is removed, and the mesoporous material is obtained.

Figure 9:
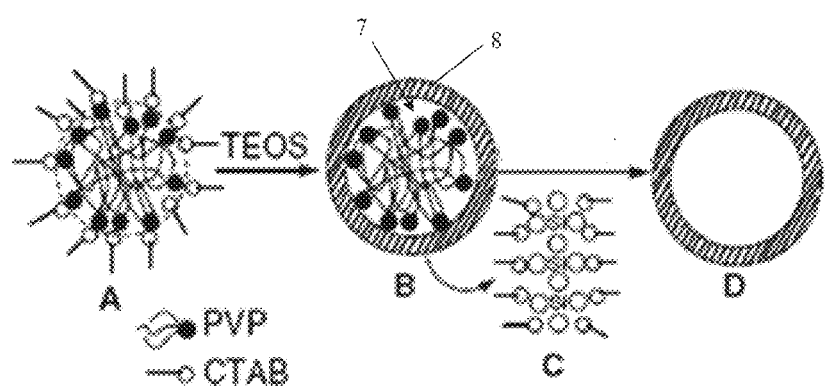
FIG. 9 is a schematic diagram of forming a template agent and forming channels with a silicon-containing material.

Specifically, step S21 may include:

S21a, adding a template agent material into the filling cavity of each sub-pixel region to form a plurality of nuclear portions 7 in each filling cavity (as shown in FIG. 9), wherein the diameters of the plurality of nuclear portions 7 in the same filling cavity are the same, the diameters of the nuclear portions 7 of the red sub-pixel region are greater than or equal to the first particle diameter, the diameters of the nuclear portions 7 of the green sub-pixel region are greater than or equal to the second particle diameter and smaller than the first particle diameter, and the diameters of the nuclear portions 7 of the blue sub-pixel region are greater than or equal to the third particle diameter and smaller than the second particle diameter;

S21b, forming a transparent shell 8 on the surface of each nuclear portion 7; and S21c, removing the nuclear portions 7 and retaining the transparent shells 8, wherein the transparent shells 8 in each filling cavity form the mesoporous material.

The nuclear portions indicate templates formed by the template agent material, and can prop the shells, so that the shells are formed on the surfaces of the nuclear portions. After the nuclear portions are removed, hollow shells can be formed.

Specifically, step S21b includes: adding a silicon-containing material, which can react with the template agent material to generate silicon dioxide, thus forming the transparent shells. Step S21c includes: removing the nuclear portions by a calcination or chemical dissolution method. The mesoporous material may be removed or retained after the quantum dots are filled, and the mesoporous material is transparent and thus does not shade light even if not being removed.

The mesoporous material (mesoporous silicon dioxide in the present invention) is formed in two phases: I, generation of an organic-inorganic liquid crystal phase (mesostructure): surfactant organic molecules with amphiphilic properties (containing hydrophilic and hydrophobic groups) and polymerizable inorganic monomer molecules or polymers (inorganic sources) are self-assembled under certain synthetic environment to generate a liquid crystal texture structure phase of an organic matter and an inorganic matter, and this structure phase has nano-scale lattice parameters; and II, generation of the mesoporous silicon dioxide material: the organic template agent (surfactant) is removed by a high-temperature thermal treatment or other physical-chemical method, and the left space is channels.

The diameters of the nuclear portions (namely the inner diameters of the channels of the mesoporous silicon dioxide) may be determined according to the molecular structure of the template agent material, for example, the inner diameters of the channels of the mesoporous silicon dioxide are increased as the chain length of the surfactant increasing under the acidic condition.

Specifically, the template agent material includes vinyl pyrrolidone (PVP) and cetyltrimethylammonium bromide (CTAB), and the silicon-containing material includes tetraethyl orthosilicate (TEOS). As shown by A to D in FIG. 9, the nuclear portions 7 are formed by the vinyl pyrrolidone (PVP), the cetyltrimethylammoniurn bromide (CTAB) is structurally attached to the nuclear portions 7 and connected with the silicon-containing material to form a silicon dioxide ($SiO_2$) shell structure, and the hollow channels are formed in the silicon dioxide shells after the nuclear portions 7 are removed.

As shown in FIG. 5 to FIG. 8, the mesoporous material 5 includes a plurality of channels, which may be arranged uprightly and regularly or non-uprightly and irregularly. In order to intuitively view the filling condition of the quantum dots in the channels, FIG. 5 to FIG. 8 schematically show the condition that the channels are upright, which does not limit the present invention.

Further specifically, step S22 may include:

S22a, adding a plurality of quantum dots with a first particle diameter into a solvent capable of dispersing the plurality of quantum dots with the first particle diameter to form a first suspension; and S22b, filling the first suspension into the channels of the mesoporous material in the filling cavity of the red sub-pixel region.

Step S23 may include:

S23a, adding a plurality of quantum dots with a second particle diameter into a solvent capable of dispersing the plurality of quantum dots with the second particle diameter to form a second suspension; and S23b, filling the second suspension into the channels of the mesoporous material in the filling cavity of the green sub-pixel region.

Step S24 may include:

S24a, adding a plurality of quantum dots with a third particle diameter into a solvent capable of dispersing the plurality of quantum dots with the third particle diameter to form a third suspension; and S24b, filling the third suspension into the channels of the mesoporous material in the filling cavity of the blue sub-pixel region.

The solvent may be organic solvent such as ethanol, acetone, or inorganic solvent such as water, as long as the quantum dots can be uniformly dispersed in the solvent, so that the quantum dots with different particle diameters are uniformly filled into the channels of the mesoporous materials of the corresponding regions.

Further, after the first suspension, the second suspension and the third suspension are separately filled into the channels of the corresponding mesoporous materials, the fabricating method further includes: S25, separately evaporating the solvents in the first suspension, the second suspension and the third suspension in the filling cavities, and retaining the quantum dots with the first particle diameter, the quantum dots with the second particle diameter and the quantum dots with the third particle diameter.

As an exemplary method of separately filling the quantum dots with the first particle diameter, the quantum dots with the second particle diameter and the quantum dots with the third particle diameter into the channels of the corresponding mesoporous materials, the mesoporous material on the color filter substrate may be firstly coated with the first suspension, the first quantum dot material enters and fully fills the channels of the mesoporous material corresponding to the red sub-pixel region by pressing the surface of the coated material, and the redundant first quantum dot material which is not filled into the channels of the mesoporous material of the corresponding red sub-pixel region is recovered. Next, the mesoporous material on the color filter substrate is sequentially coated with the second suspension and the third suspension in the same way, so that the second quantum dot material fully fills the channels of the mesoporous material corresponding to the green sub-pixel region, and the third quantum dot material fully fills the channels of the mesoporous material corresponding to the blue sub-pixel region.

As an embodiment, the quantum dots are made of cadmium selenide, the first particle diameter is more than or equal to 1.5 nm and less than 2.5 nm, the second particle diameter is more than or equal to 2.5 nm and less than 3.5 nm, and the third particle diameter is more than or equal to 3.5 nm and less than or equal to 4.5 nm.

As a third aspect of the present invention, provided is a display panel, including the above color filter substrate according to the present invention. Each sub-pixel region of the color filter substrate is provided with a filling cavity filled with quantum dots, so color resistance blocks are not needed, the fabricating process of the product is simplified, and pictures displayed by the display panel using the color filter substrate with the quantum dots are wider in color gamut and higher in saturation.

As a fourth aspect of the present invention, provided is a display device, including the above display panel according to the present invention and a back light, wherein the back light is used for emitting light with a single wavelength.

Specifically, the light emitted by the back light is blue light or purple light, the quantum dots with different particle diameters can emit light of different wavelengths under the excitation of the back light, and the wavelength of the emitted light is greater than that of the excitation light.

The display device of the present invention may be any product or component with a display function, such as a liquid crystal television, a liquid crystal display, a tablet personal computer, a digital photo frame, a mobile phone and the like.

Because the display panel has wider display color gamut and higher saturation, the display effect of the display device of the present invention is better; and the fluorescence lifetime of the quantum dots is longer than that of an organic fluorescent dye, so that the service life of the display device is prolonged.

It could be understood that, the above embodiments are merely exemplary embodiments adopted for describing the principle of the present invention, but the present invention is not limited thereto. Various variations and modifications may be made for a person skilled in the art without departing from the spirit and essence of the present invention, and these variations and modifications shall fall into the protection scope of the present invention.

The invention claimed is:

1. A color filter substrate, comprising a plurality of pixel units, each pixel unit comprises a plurality of sub-pixel regions, wherein a filling cavity is formed in each sub-pixel region, at least a top wall of the filling cavity is transparent, the filling cavity is filled with quantum dots, the quantum dots in all the filling cavities are made of the same material, the particle diameters of the quantum dots in the same filling cavity are the same, particle diameters of the quantum dots in the filling cavities of different sub-pixel regions of any pixel unit are different, and accordingly, the quantum dots in the filling cavities of different sub-pixel regions can emit light with different colors after being excited, wherein a mesoporous material is at least arranged in the filling cavities of a blue sub-pixel region and a green sub-pixel region, the mesoporous material is provided with a plurality of channels, the quantum dots in the filling cavities of the blue sub-pixel region and the green sub-pixel region are filled in the channels of the corresponding mesoporous material, inner diameters of the channels of the mesoporous material in the same filling cavity are the same, the inner diameters of the channels of the mesoporous material in the filling cavity of the green sub-pixel region are smaller than the particle diameters of the quantum dots in the filling cavity of a red sub-pixel region, and the inner diameters of the channels of the mesoporous material in the filling cavity of the blue sub-pixel region are smaller than the particle diameters of the quantum dots in the filling cavity of the green sub-pixel region.

2. The color filter substrate of claim 1, wherein the color filter substrate comprises a substrate as well as a black matrix and a transparent packaging adhesive layer arranged on the substrate, the black matrix is arranged at the boundary of each sub-pixel region, and the filling cavities are defined by the black matrix, the transparent packaging adhesive layer and the substrate.

3. The color filter substrate of claim 1, wherein the material of the quantum dots is any one of cadmium selenide, cadmium sulfide, cadmium telluride and zinc selenide.

4. The color filter substrate of claim 3, wherein each pixel unit comprises a red sub-pixel region, a blue sub-pixel region and a green sub-pixel region, the quantum dots are made of cadmium selenide, the particle diameters of the quantum dots in the filling cavity of the blue sub-pixel region are more than or equal to 1.5 nm and less than 2.5 nm, the particle diameters of the quantum dots in the filling cavity of the green sub-pixel region are more than or equal to 2.5 nm and less than 3.5 nm, and the particle diameters of the quantum dots in the filling cavity of the red sub-pixel region are more than or equal to 3.5 nm and less than or equal to 4.5 nm.

5. The color filter substrate of claim 1, wherein the mesoporous material is arranged in the filling cavities of the red sub-pixel region, the blue sub-pixel region and the green sub-pixel region, and the quantum dots in the filling cavity of the red sub-pixel region are filled in the channels of the corresponding mesoporous material of the red sub-pixel region.

6. A display panel, comprising the color filter substrate according to claim 1.

7. A display device, wherein it comprising the display panel according to claim 6 and a back light, the back light is used for emitting light with a single wavelength.

8. A method for fabricating a color filter substrate, wherein the color filter substrate comprises a plurality of pixel units, each pixel unit comprises a plurality of sub-pixel regions, and the fabricating method comprises:
   S1, forming a filling cavity with an opening in each sub-pixel region;
   S2, filling the filling cavity of each sub-pixel region with quantum dots, wherein the quantum dots in all the filling cavities are made of the same material, particle diameters of the quantum dots in the same filling cavity are the same, and the particle diameters of the quantum dots in the filling cavities of different sub-pixel regions of any pixel unit are different; and
   S3, forming a top wall of each filling cavity, wherein at least the top wall of each filling cavity is transparent, wherein each pixel unit comprises a red sub-pixel region, a blue sub-pixel region and a green sub-pixel region, and step S2 comprises:
   S21, separately forming a mesoporous material in the filling cavities of the blue sub-pixel region and the green sub-pixel region, wherein the mesoporous material is provided with a plurality of channels, inner diameters of the channels of the mesoporous material in the same filling cavity are the same, and the inner diameters of the channels of the mesoporous material in the filling cavity of the green sub-pixel region are greater than those of the channels of the mesoporous material in the filling cavity of the blue sub-pixel region,
   S22, filling the filling cavity of the red sub-pixel region with a plurality of quantum dots with a first particle diameter;
   S23, filling the channels of the mesoporous material in the filling cavity of the green sub-pixel region with a plurality of quantum dots with a second particle diameter, wherein the inner diameters of the channels of the mesoporous material in the filling cavity of the green sub-pixel region are greater than or equal to the second particle diameter and smaller than the first particle diameter; and
   S24, filling the channels of the mesoporous material in the filling cavity of the blue sub-pixel region with a plurality of quantum dots with a third particle diameter, wherein the inner diameters of the channels of the mesoporous material in the filling cavity of the blue sub-pixel region are greater than or equal to the third particle diameter and smaller than the second particle diameter.

9. The fabricating method of claim 8, wherein step S1 comprises: forming a black matrix at the boundary of each sub-pixel region on a substrate;
   step S3 comprises: forming a transparent packaging adhesive layer.

10. The fabricating method of claim 8, wherein the material of the quantum dots is any one of cadmium selenide, cadmium sulfide, cadmium telluride and zinc selenide.

11. The fabricating method of claim 8, wherein steps S21, S23 and S24 further separately comprise a step of recovering the quantum dots which are not filled into the channels of the mesoporous material.

12. The fabricating method of claim 8, wherein step S21 further comprises: arranging the mesoporous material in the filling cavity of the red sub-pixel region, the inner diameters of the channels of the mesoporous material in the filling cavity of the red sub-pixel region are greater than or equal to the first particle diameter;
   step S22 further comprises: filling the plurality of quantum dots with the first particle diameter into the channels of the mesoporous material in the filling cavity of the red sub-pixel region.

13. The fabricating method of claim 12, wherein step S21 comprises:
   S21a, adding a template agent material into the filling cavity of each sub-pixel region to form a plurality of nuclear portions in each filling cavity, wherein the diameters of the plurality of nuclear portions in the same filling cavity are the same, the diameters of the nuclear portions in the filling cavity of the red sub-pixel region are greater than or equal to the first particle diameter, the diameters of the nuclear portions in the filling cavity of the green sub-pixel region are greater than or equal to the second particle diameter and smaller than the first particle diameter, and the diameters of the nuclear portions in the filling cavity of the blue sub-pixel region are greater than or equal to the third particle diameter and smaller than the second particle diameter;
   S21b, forming a transparent shell on the surface of each nuclear portion; and
   S21c, removing the nuclear portions and retaining the transparent shells, a plurality of transparent shells in each filling cavity form the mesoporous material.

14. The fabricating method of claim 13, wherein step S21b comprises: adding a silicon-containing material which can react with the template agent material to generate silicon dioxide, thus forming the transparent shells.

15. The fabricating method of claim 14, wherein the template agent material comprises vinyl pyrrolidone and cetyltrimethylammonium bromide, and the silicon-containing material comprises tetraethyl orthosilicate.

16. The fabricating method of claim 12, wherein,
   step S22 comprises:
   S22a, adding a plurality of quantum dots with a first particle diameter into a solvent capable of dispersing the plurality of quantum dots with the first particle diameter to form a first suspension; and S22b, filling the first suspension into the channels of the mesoporous material in the filling cavity of the red sub-pixel region;

step S23 comprises:

S23a, adding a plurality of quantum dots with a second particle diameter into a solvent capable of dispersing the plurality of quantum dots with the second particle diameter to form a second suspension; and S23b, filling the second suspension into the channels of the mesoporous material in the filling cavity of the green sub-pixel region;

step S24 comprises:

S24a, adding a plurality of quantum dots with a third particle diameter into a solvent capable of dispersing the plurality of quantum dots with the third particle diameter to form a third suspension; and S24b, filling the third suspension into the channels of the mesoporous material in the filling cavity of the blue sub-pixel region.

17. The fabricating method of claim 16, wherein the fabricating method further comprises:

separately evaporating the solvents in the first suspension, the second suspension and the third suspension in the filling cavities.

18. The fabricating method of claim 8, wherein the quantum dots are made of cadmium selenide, the first particle diameter is more than or equal to 1.5 nm and less than 2.5 nm, the second particle diameter is more than or equal to 2.5 nm and less than 3.5 nm, and the third particle diameter is more than or equal to 3.5 nm and less than or equal to 4.5 nm.

* * * * *